Patented Feb. 9, 1926.

1,571,976

UNITED STATES PATENT OFFICE.

CHARLES E. SWETT, OF WEST ROXBURY, MASSACHUSETTS, ASSIGNOR TO UNITED STATES ENVELOPE COMPANY, OF SPRINGFIELD, MASSACHUSETTS, A CORPORATION OF MAINE.

PROCESS OF MAKING TRANSPARENT PAPER.

No Drawing. Application filed August 11, 1924. Serial No. 731,526.

*To all whom it may concern:*

Be it known that I, CHARLES E. SWETT, a citizen of the United States, residing at West Roxbury, in the county of Suffolk and Commonwealth of Massachusetts, have invented a new and useful Improvement in Processes of Making Transparent Paper, of which the following is a specification.

The present invention relates to processes of treating paper to render the same transparent, and is particularly applicable to the treatment of such material as is used for the transparent patches or panels of so-called window envelopes, i. e., envelopes of the type having an opening therein over which is secured a covering of glassine paper, or other similar transparent or semi-transparent material.

Glassine paper differs from most other papers in that the cellulose matter therein is so nearly homogeneous that few lacunæ are in evidence; as a result, glassine paper possesses a high degree of optical continuity. The surface of glassine paper is, however, interrupted by inequalities which tend to scatter light rather than permit its free transmission, and it is known that if these surface inequalities be filled with a filmlike material of a transparent nature, then the transparency of the glassine paper, or similar material, is enchanced. When a resinous varnish is employed for filling the surface inequalities of glassine paper, it has been found that while the transparency of the paper is enhanced, a difficulty in the use of the treated paper immediately presents itself, owing to the fact that water soluble adhesives do not stick the treated panel material to the paper of envelopes in a sufficiently firm manner.

The object of the present invention is to increase the transparency of glassine paper, or similar material, without adversely affecting its ability to be affixed with a water soluble adhesive, and to this end, I employ tannin, or tannic acid, for the film forming substance. The tannic acid is preferably applied in alcoholic solution, which does not cockle the glassine paper in the manner of an aqueous solution. This alcoholic solution, upon drying, forms a film which fills the surface irregularities of the paper, and thereby increases the transparency thereof to a considerable extent. At the same time, the film does not resist water or water soluble adhesives, so that the treated paper may be readily affixed to the paper of envelopes.

In the practice of my invention, it has been found advantageous to employ terpin hydrate in solution with the tannic acid, this latter substance serving to impart a higher refractive index to the film which results upon the evaporation of the alcohol. In addition to terpin hydrate, there are a number of organic substances soluble in the same menstrua as tannic acid which will improve the transparent qualities of the resulting film; in a general way, these materials are of a phenolic nature and are capable of forming solid solutions with the tannic acid.

I claim,

1. The treatment of glassine paper with a nonaqueous solution of tannic acid.

2. The treatment of glassine paper with an alcoholic solution containing tannic acid and terpin hydrate.

3. The treatment of glassine paper with a nonaqueous solution of tannic acid and a material of relatively high refractive index capable of forming a solid solution with the tannic acid when the liquid solvent is evaporated.

CHARLES E. SWETT.